United States Patent [19]
Potter

[11] Patent Number: 6,061,810
[45] Date of Patent: May 9, 2000

[54] COMPUTER SYSTEM WITH ERROR HANDLING BEFORE RESET

[75] Inventor: Mark R. Potter, Houston, Tex.

[73] Assignee: Compaq Computer Corporation, Houston, Tex.

[21] Appl. No.: 08/760,500

[22] Filed: Dec. 5, 1996

Related U.S. Application Data

[63] Continuation of application No. 08/303,404, Sep. 9, 1994, Pat. No. 5,600,785.

[51] Int. Cl.[7] .................................................. G06F 11/34
[52] U.S. Cl. ................................................................ 714/23
[58] Field of Search ........................ 395/182.21, 185.08, 395/183.15, 183.08; 371/62; 714/23, 48

[56] References Cited

U.S. PATENT DOCUMENTS

| 4,803,682 | 2/1989 | Hana et al. ................................ 371/62 |
| 4,982,404 | 1/1991 | Hartman .................................... 371/62 |
| 5,041,962 | 8/1991 | Lunsford .................................. 364/200 |
| 5,139,473 | 8/1992 | Bradshaw et al. ......................... 600/3 |
| 5,251,227 | 10/1993 | Bruckert et al. ........................ 395/182 |
| 5,333,285 | 7/1994 | Drerup ..................................... 395/575 |
| 5,390,324 | 2/1995 | Burckhartt et al. ................. 395/185.08 |

FOREIGN PATENT DOCUMENTS

| 051 920 | 5/1982 | European Pat. Off. . |
| 260 568 | 3/1988 | European Pat. Off. . |
| 428 917 | 5/1991 | European Pat. Off. . |
| 440 451 | 8/1991 | European Pat. Off. . |

OTHER PUBLICATIONS

*IBM Technical Disclosure Bulletin*, Mar. 1980, U.S., European Patent Office, vol. 22, pp. 4690–4691.

*Primary Examiner*—Phung M. Chung
*Attorney, Agent, or Firm*—Akin, Gump, Strauss, Hauer & Feld, LLP

[57] ABSTRACT

A computer system includes error handling hardware and software that logs the source of application program or system software errors before a reset occurs. Upon a catastrophic error, a retriggerable timer, which is periodically retriggered during normal system operation, instead times out causing a hardware reset. A predetermined time before this retriggerable timer times out, however, the microprocessor in the computer system is interrupted, and executes an interrupt routine in which it determines that the retriggerable timer is about to timeout, and logs the currently executing applications program or currently executing point in system software, as well as the actual location within the applications program or the system software. The reset subsequently occurs, but not before this information valuable for debugging and diagnosis is logged.

21 Claims, 5 Drawing Sheets

COMPUTER SYSTEM WITH ERROR HANDLING BEFORE RESET

This is a continuation, of application Ser. No. 08/303,404, filed Sep. 9, 1994, now U.S. Pat. No. 5,600,785.

BACKGROUND OF THE INVENTION

1. Field of the Invention

The invention relates to computer failure handling systems, and more particularly, to a failure handling system that logs failures before a hardware reset occurs.

2. Description of Related Art

The microcomputer world has become a world of interdependence. No longer does a microcomputer system sit on an executive's desk insulated from the outside world. The art has seen the development of massively networked environments in which microcomputers act as both workstations and servers, in which networks connect multiple servers, and in which various telecommunication services connect networks to networks.

A microcomputer that acts as a network server has become particularly important. It demands high reliability, because failures of such a server will typically shut down the network. Such failures will always occur, however, even in the most fault redundant of systems. So when a server fails, the ease of repair then becomes a critical factor. The first, and often most time-consuming, step to repair is diagnosis. The more quickly and easily a technician can diagnose the cause of the failure, the sooner the network will again be on line. When a server fails for a quickly identifiable reason, that server can typically be brought back on line in a relatively short amount of time. A failure for an unknown reason, however, can lead to extensive debugging and trouble-shooting time, leaving the network without its key component.

Therefore, any advances that enhance the ability to diagnose the cause of a computer system failure, especially in a network, would be greatly desirable.

Previous advances over the art dealt with computer failure recovery and alert systems that determined when and whether a computer had in fact failed. Such systems included an automatic system recovery (ASR) timer, which would time out if the operating system did not periodically reload that timer. Under normal operating conditions, the operating system would continuously reload the timer so that it would never time out. When the computer failed, however, the operating system would be unable to reload the ASR timer, so the timer would time out, signalling a system failure and causing a system hardware reset. After the reset and subsequent restart, the computer system would determine the source of the problem as well as it was able, such as by checking for bad memory blocks or by executing diagnostic routines.

Such a computer system is fully described in U.S. patent application Ser. No. 07/955,849 to Burckhartt, filed Oct. 2, 1992 now U.S. Pat. No. 5,390,324 and entitled "Computer Failure Recovery and Alert System." That application, which has been assigned to the assignee of the present application, is hereby incorporated by reference. That application describes the details of a system using an ASR timer.

Such a system, however, is limited in its ability to determine the cause of the system failure leading to a reset. Typically, such a system failure occurs when an application program or the operating system becomes caught in an infinite loop while interrupts are disabled. In such a situation, it is generally impossible to return control to the operating system to terminate the offending application program, or, if the failure is within the operating system itself, such a failure would typically be a catastrophic error and it would be undesirable to continue execution within the failed operating system.

In either case, a hardware reset would occur upon timeout of the ASR timer. On rebooting, the operating system then would have no way of determining where the operating system or application program had become stuck in such an infinite loop. As noted above, this inability to identify the source of the problem could lead to aggravating debugging difficulties for a technician.

Therefore, it would be greatly desirable to provide the capability of logging the cause of a hardware reset resulting from an ASR timer timeout for later diagnostic purposes.

SUMMARY OF THE INVENTION

In a computer system with error handling before reset constructed according to the invention, the computer system determines that a hardware reset will occur within a predetermined period of time. When it is so determined, the computer system executes an interrupt routine in which it logs certain system information identifying the source of the problem.

More specifically, the system logs the location where the operating system or applications program was executing when the interrupt occurred. This is logged to a non-volatile random access memory, indicating where the error occurred that is to result in the subsequent reset. Once that information is logged, the system reset follows, causing the computer system to restart.

To determine whether a reset will occur within a predetermined period of time, the computer system implements a reloadable timer that it periodically reloads during normal system operation. When an error occurs that prevents the operating system from reloading that timer, that timer then continues to count down rather than being reloaded. According to one embodiment, when that timer counts down to below a predetermined threshold, this causes a non-maskable interrupt to occur to the microprocessor. The microprocessor then determines that the reloadable timer was the cause of the interrupt, and the computer system logs information about the operating system or the currently executing applications program, such as the last executed program step and the module's name, before returning from the interrupt. Later, when the reloadable timer counts down to zero, this causes a system hardware reset. After the reset, the information log can be checked and the stored information retrieved to allow the offending module to be removed or further tested.

According to another embodiment, the reloadable timer counts down to zero upon a system failure. It then provides a signal that causes a system interrupt, as well as causing a second timer to begin counting down. The system interrupt permits the operating system to determine the currently executing application program and to log that information. Once the second timer counts down to zero, this causes a system reset.

The operating system of the computer system is preferably Netware by Novell, and the log information concerns the currently executing instruction within a Netware Loadable Module (NLM).

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
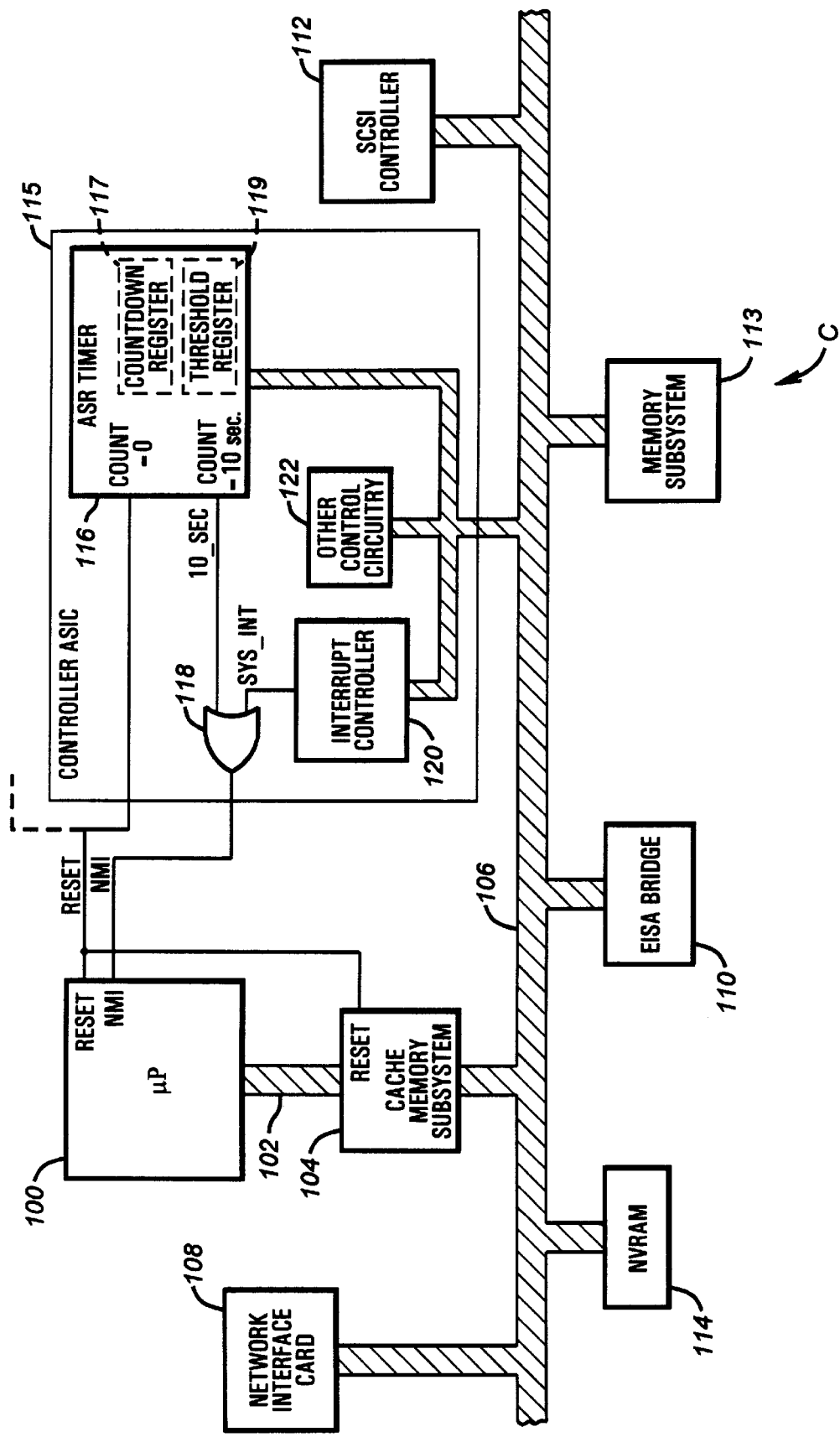
FIG. 1 is a block diagram showing functional blocks and circuitry in a computer system implemented according to the invention.

Turning to FIG. 1, a block diagram of a microcomputer system C implementing the error handling before reset according to the invention is shown. The microcomputer system C includes a microprocessor 100 connected through a processor bus 102 to a cache memory subsystem 104. In the disclosed embodiment, the microprocessor 100 is typically a 80486 or Pentium® processor by Intel Corporation, although a system according to the invention could be implemented using a wide variety of microprocessors.

The cache memory subsystem 104 in turn is connected to a local bus 106, which in turn couples the microprocessor 100 to a variety of other devices, including a network interface controller 108, an EISA bridge 110, a SCSI controller 112, a memory subsystem 113, and a non-volatile random access memory (NVRAM) 114. Other devices can also be connected to the local bus 106. Other computer system architectures and organizations can also be used with the present invention.

A controller application specific integrated circuit (controller ASIC) 115 is also connected to the local bus 106. The controller ASIC 115 internally includes an ASR timer 116 that provides a system reset signal RESET true, or high, when an internal countdown register 117 equals zero. The ASR timer 116 further provides a 10-second before reset signal 10_SEC, which when true indicates that the internal countdown register 117 equals, in one embodiment, a predetermined count, such as 255, remaining in the countdown register 117, or, in a second embodiment, equals a value in a threshold register 119. Both the internal countdown register 117 and the threshold register 119 are accessible over the local bus 106. Using appropriate I/O operations, the microprocessor 100 can thus reload the internal countdown register 117 to prevent it from counting down to zero or to the predetermined value or the threshold value in the threshold register 119, and the microprocessor 100 can similarly load the threshold register 119 to set a predetermined count at which the reset signal 10_SEC will be asserted. When 10_SEC goes true, indicating the internal countdown register 117 equals the predetermined value or the threshold register 119, the ASR timer 116 will provide RESET true in a period equal to the predetermined number or the threshold register 119 value divided by the countdown register 119 clock frequency unless the ASR timer 116 is first reloaded. An OR gate 118 receives as inputs 10_SEC along with a system interrupt signal SYS_INT, which is provided by an interrupt controller 120. The controller ASIC 115 further preferably includes other system control circuitry 122.

The ASR timer 116, the interrupt controller 120, and the other circuitry 122 are all coupled to the local bus 106. The microprocessor 100, as well as other bus masters, thus communicate with these devices over that local bus 106 using standard memory and I/O operations.

The output of the OR gate 118 is provided as a non-maskable interrupt signal NMI. The microprocessor 100 has both NMI and RESET inputs. Other devices, such as the cache memory subsystem 104, also typically use RESET as a hardware reset input.

The interrupt controller 120 generates SYS_INT in the same manner in which prior art interrupt controllers would generate a non-maskable interrupt signal in response to various system stimuli. Thus, NMI is a standard NMI interrupt signal typically used by microprocessors, but modified in that it also includes the 10_SEC signal combined through the OR gate 118. When either 10_SEC or SYS_INT goes true, or high, NMI thus goes true.

The cache memory subsystem 104, the network interface controller 108, the SCSI controller 112, the EISA bridge 110, the memory subsystem 113, and the NVRAM 114 are all standard components and can be a wide variety of devices. The interrupt controller 120 within the controller ASIC 115 is standard interrupt controller circuitry that would create standard non-maskable interrupt signals, as well as various other interrupt signals not shown. The other circuitry 122 within the controller ASIC 115 is standard system control circuitry, and could be omitted from the controller ASIC 115 without affecting the system constructed according to the invention. The exact system configuration could further be modified without detracting from the spirit of the invention, such as by connecting the NVRAM 114 to the controller ASIC 115 rather than directly to the local bus 106.

In operation, the internal countdown register 117 of the ASR timer 116 continuously counts down in response to a relatively slow clock input that is not shown. This clock is preferably a 28.125 Hz clock. When the internal countdown register 117 within the ASR timer 116 reaches zero, the ASR timer 116 asserts RESET true, causing all components, including the microprocessor 100, that are provided with RESET to reset their internal circuitry. Other circuitry is also typically associated with the ASR timer 116, such as a mask register to prevent reset immediately upon system startup. This circuitry, omitted for clarity, is further described in U.S. patent application Ser. No. 07/955,849, previously incorporated herein.

Typically, the microprocessor 100 completely resets its internal circuitry on receipt of an active true RESET. The microprocessor 100 then cannot perform any further operations. Instead the computer system C then simply restarts.

The ASR timer 116 is provided to institute total system restart under catastrophic failure conditions. The computer system C is preferably implemented as a server running Netware by Novell, which is a standard network controlling operating system. Netware permits many tasks to run simultaneously within the computer system C, and also allows these tasks to disable interrupts. A serious problem could occur should one of these tasks disable interrupts and then get caught in an infinite loop, either through programming error or some other unforeseen fault condition.

In operation, the ASR timer 116 causes a system reset when such a fault occurs. A certain Netware module which is normally executed periodically based on operation of a timing interval provided by a timer interrupt periodically reloads the internal countdown register 117 in the ASR timer 116 through standard I/O operations to the controller ASIC 115. In this way, during normal systems operation, the ASR timer 116 will never count down to zero causing a reset.

Should that periodically executed Netware application fail to reload the ASR timer 116, however, the internal countdown register 117 slowly counts down to zero, whereupon the entire system resets. In such a condition, however, there is no way to determine where the system failed or became caught in an infinite loop causing that ASR timer 116 to time out.

To remedy this, the ASR timer 116 also provides 10_SEC. When the internal countdown register 117 within the ASR timer 116 reaches a count that corresponds to the predetermined value or the value in the threshold register 119, 10_SEC goes active true, or high. This causes the output of the OR gate 118 to similarly go high, forcing NMI true, or high. This causes a non-maskable interrupt to occur in the microprocessor 100. In the preferred embodiment, the predetermined count is a value of 255 with a 28.125 Hz clock, which provides the 10_SEC signal at approximately 9 seconds before the RESET signal occurs. If the threshold register 119 is used, differing values could be used, but the threshold value should be sufficient to allow the program steps described below to fully operate.

The microprocessor 100 then executes non-maskable interrupt processing logic approximately ten seconds before a catastrophic system failure caused by a timeout of the ASR timer 116. Because the NMI is not masked by the faulty software, the NMI will interrupt the faulty software, allowing the NMI processing to occur. According to the invention, when NMI is received, the microprocessor 100 then determines the source of the catastrophic failure and logs that source to a semi-permanent location, such as the NVRAM 114. After the failure source is logged, the NMI processing software then passes control to the exception handler. Control is not returned to the faulty software, because if caused a problem in the first place. Then, approximately 10 seconds later, the ASR timer 116 times out and the computer system C resets, but only after logging the cause of the catastrophic reset.

Figure 2:
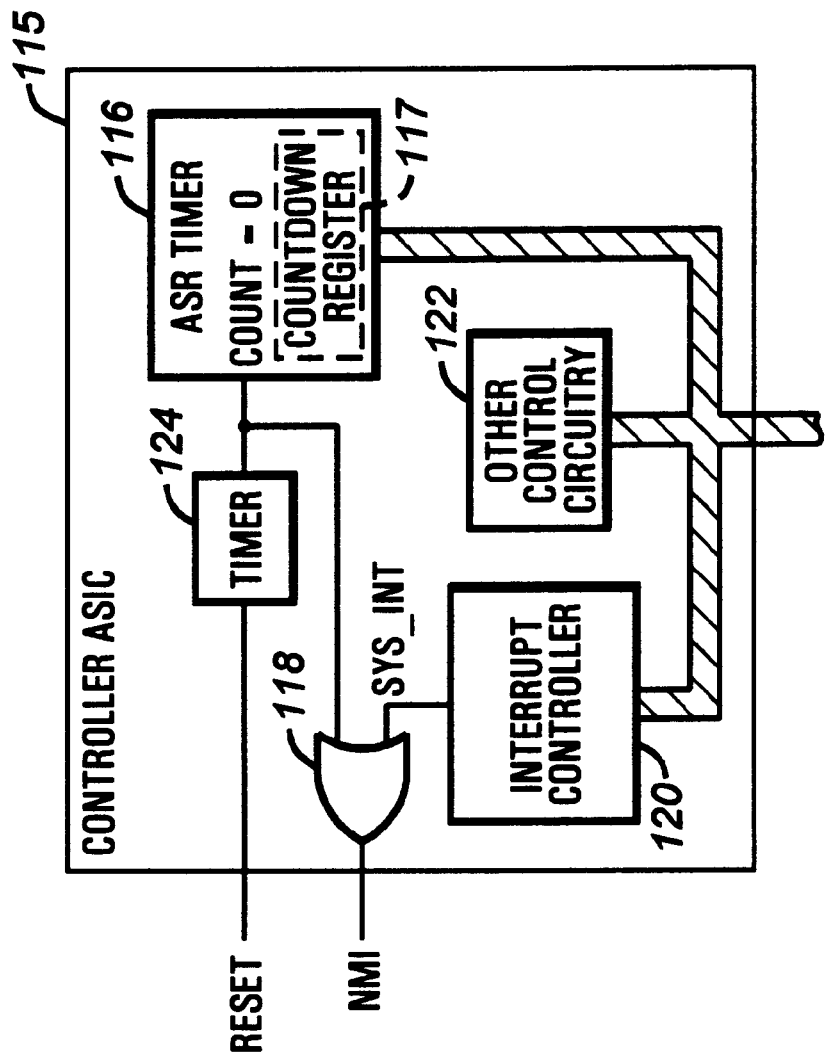
FIG. 2 is a block diagram of an alternative embodiment of a controller application specific integrated circuit implementing circuitry according to the invention.

Turning to FIG. 2, alternative circuitry for implementation in the controller ASIC 115 is shown. In this embodiment, the ASR timer 116, the OR gate 118, the interrupt controller circuitry 120, and the other controller circuitry 122 all remain in the controller ASIC 115. In this case, the ASR timer 116 only includes a count-equal-zero output that when true indicates the internal countdown register 117 has timed out. This output is then provided as an input to the OR gate 118 instead of as 10_SEC as shown in FIG. 1. The output of the ASR timer 116 is further provided as an input to a separate timer 124. This timer 124 provides RESET, but only after a period has passed since receiving a true pulse from the output of the ASR timer 116. The period of this timer 124 can be based on a predetermined count, such as 255, or based on a register value to allow more flexibility.

It is understood that this is the functional equivalent of the circuitry in the controller ASIC 115 shown in FIG. 1. There are many ways to implement this delay before reset, and one of ordinary skill in the art will appreciate that any of these various methods could be used without departing from the spirit of the invention.

Figure 3:
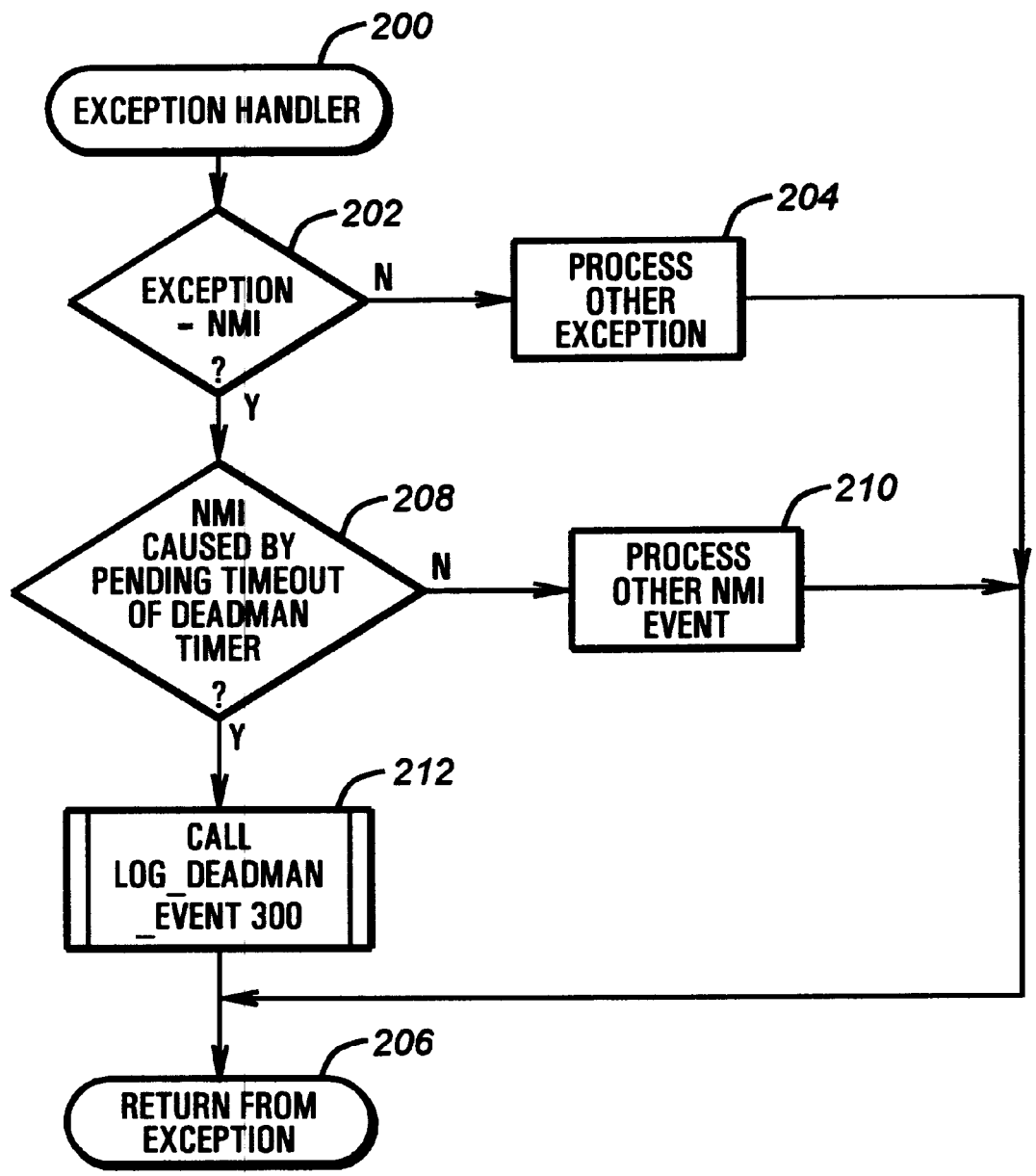
FIG. 3 is flowchart illustration of an exception handler routine that handles interrupts generated within the computer system shown in FIG. 1.
Figure 4A:
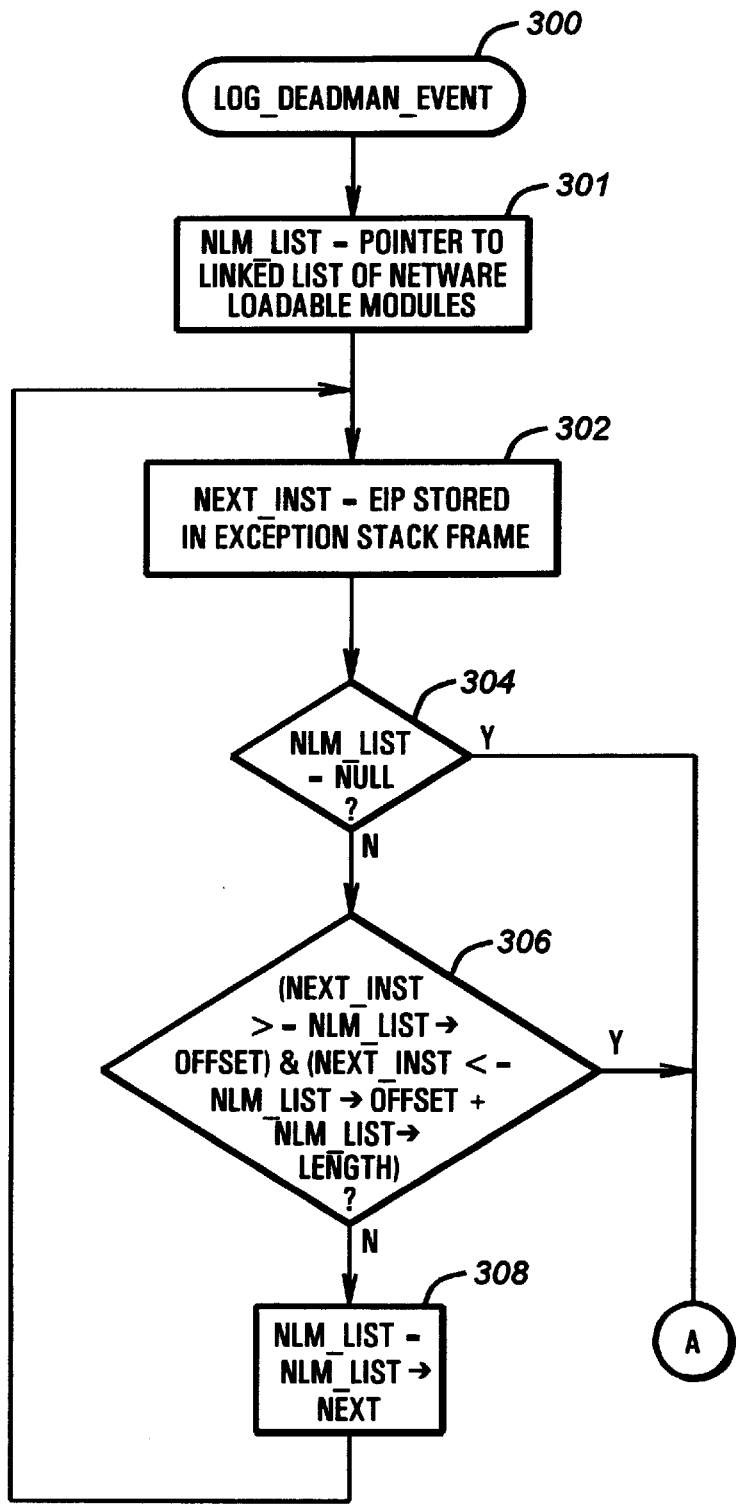
FIGS. 4A and 4B are flowchart illustrations of a routine that logs information concerning the currently executing application program upon a system failure.
Figure 4B:
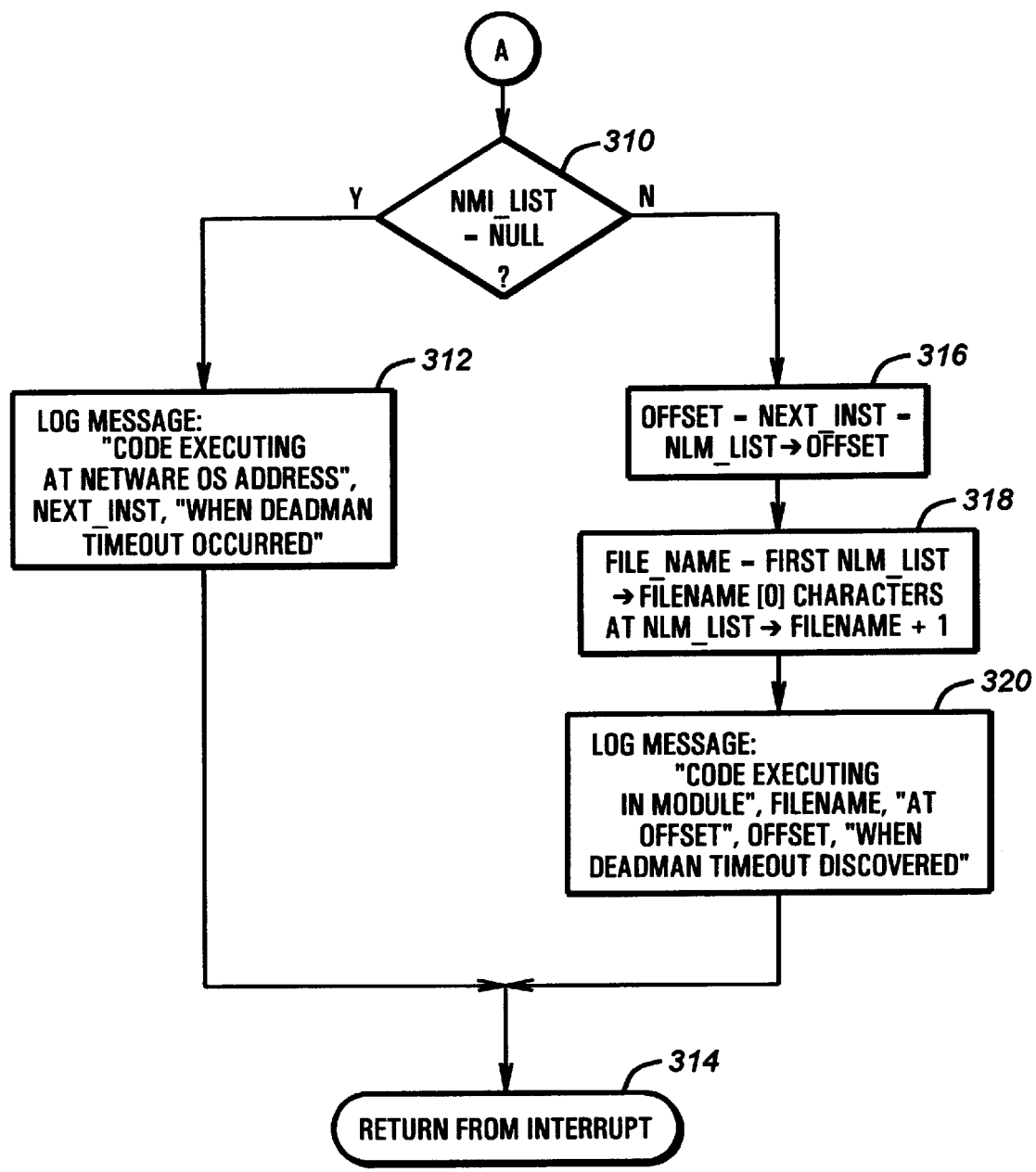

Turning to FIGS. 3, 4A, and 4B, these figures are flowchart illustrations of the software that is preferably executed upon NMI going true. Turning to FIG. 3, an exception handler routine 200 is entered by the microprocessor 100 on receipt of NMI true. Such a non-maskable interrupt occurs either because the ASR timer 116 will timeout in ten seconds or because the interrupt controller circuitry 120 has received stimuli indicating a non-maskable interrupt should be executed for other reasons. Proceeding to step 202, the exception handler routine 200 first determines whether this particular exception was caused by NMI being asserted. The exception handler routine 200 preferably handles all sorts of interrupts, including software exceptions and maskable hardware interrupts provided by circuitry not shown. If the exception is caused by something other than an NMI, the exception handler routine 200 proceeds from step 202 to step 204, where it processes these other exceptions, and then on to step 206, where the exception handler routine 200 returns from the exception.

If at step 202 the exception was caused by a non-maskable interrupt, however, control proceeds to step 208, where it is determined whether the non-maskable interrupt was caused by a pending timeout of the ASR timer 116 as indicated by 10 SEC being asserted. To determine this, the microprocessor 100 performs an I/O access to the controller ASIC 115, reading the current contents of the countdown register within the ASR timer 116. If the countdown register has not fallen below a predetermined threshold, preferably 255 when the predetermined count is used, then the countdown register did not cause NMI to be asserted. In that case, control proceeds to step 210, where other NMI events are processed using standard software. This would be the case where the interrupt controller 120 had determined an NMI was appropriate and had asserted SYS_INT to indicate as such. From step 210, control then proceeds to step 206, where the exception handler 200 returns from the exception.

If at step 208 it was determined that the non-maskable interrupt was caused by a pending timeout of the ASR timer 116, control proceeds to step 212, where a routine LOG_DEADMAN_EVENT 300 is called. That routine 300 logs the location at which the microprocessor 100 was executing when the non-maskable interrupt occurred and is further discussed below in conjunction with FIGS. 4A and 4B. After LOG_DEADMAN_EVENT 300 is called at step 212, control proceeds again to step 206, where the exception handler routine 200 returns from the exception. If a pending ASR timer 116 timeout caused the NMI, the software does not return to the offending code, since it is known to be faulty. In any case, the non-maskable interrupt was caused by a pending timeout of the ASR timer 116, the system will then shut down in approximately ten seconds in response to RESET going true as the interrupted software will continue to loop with the maskable interrupts disabled.

Turning to FIGS. 4A and 4B, flowcharts are shown of code typically used to implement the routine LOG_DEADMAN_EVENT 300, called from step 212. In the disclosed embodiment, it is presumed that the computer system C is running the Netware software by Novell, though the operation would be similar on other standard network operating systems, such as UNIX, Vines by Banyan and Windows NT by Microsoft.

The Netware operating system maintains a linked list of control blocks for NLMs. An "NLM" is a Netware Loadable Module, an application that is in a proper format for execution by Netware. Each entry in the linked list includes a pointer to a data structure containing information about that particular NLM. The data structure includes a memory address of where that NLMs code starts, as well as a length variable indicating the size of that NLM's code. The data structure contains the file name of the particular NLM. The data structure also includes a pointer to the next data structure in the linked list of NLMs. These data structures are well known to those skilled in the art of programming for the Netware operating system.

The software illustrated in FIGS. 4A and 4B also assumes that the microprocessor 100 handles non-maskable interrupt exceptions according to the 80386 and above architectures, though it is understood that other microprocessors operate in a similar fashion and could be used to execute software according to the present invention. This architecture is well known to those in the art of computer system design. Exceptions in the 80386 and above architectures cause information to be pushed onto the stack. One element of this information is the exception instruction pointer (EIP), which points to either the last executed instruction or to the next instruction to execute, depending upon the exception.

Turning to LOG_DEADMAN_EVENT 300, in general this routine sequentially examines each currently loaded NLM to determine whether the microprocessor 100 was executing instructions in that NLM when the exception occurred. If so, then that NLM was the source of the problem, so information about it is logged to the NVRAM 114.

Control first proceeds to step 301, where a variable NLM_LIST is set to the address of the first NLM in the linked list of NLMs. Proceeding to step 302, a variable NEXT_INST is set to the EIP currently stored in the exception stack frame. Thus, NEXT_INST indicates the next instruction to be executed after the interrupt. Proceeding to step 304, it is determined whether NLM_LIST equals a null value. A non-null value indicates that NLMs remain in the linked list that should be examined to determine at what location the microprocessor 100 was executing when the current NMI event occurred. If NLM_LIST is non-null, control proceeds to step 306.

At step 306, LOG_DEADMAN_EVENT 300 determines whether the NLM whose control block is pointed to by NLM_LIST was the currently executing module when NMI was asserted. NEXT_INST is compared to the memory offset for this NLM pointed to by NLM_LIST as well as to the memory offset plus the length pointed to by NLM_LIST. If NEXT_INST, the address of the next instruction, is greater than the offset address of the currently pointed to NLM but is less than the offset plus the length, then the currently pointed to NLM was executing when the NMI occurred. Otherwise, the pointed-to NLM was not executing when the NMI occurred, so control proceeds to step 308, where NLM_LIST is set to point the next NLM control block. Control then proceeds to step 302 to examine the next NLM to determine if processing was occurring there when NMI was asserted.

If at step 304 LOG_DEADMAN_EVENT 300 has examined all of the NLMs (indicated by NLM_LIST being null) or if at step 306 it was determined that processing was occurring within the pointed-to NLM when the NMI occurred, control then proceeds to step 310 shown in FIG. 4B. At step 310, NLM_LIST is compared to NULL. If true, control proceeds to 312, because no NLM was found where processing was occurring when the NMI occurred. In that case, a message is logged to the NVRAM 114 stating that "The code was executing at Netware OS address [NEXT_INST] when dead man timeout occurred." On the next restart, it will then at least be known where the system was executing when the ASR timeout occurred, even if an actual NLM was not the problem. Control then proceeds to step 314, where LOG_DEADMAN_EVENT 300 returns to the exception handler routine 200.

If at step 310 NLM_LIST is not null, this indicates that the culprit NLM module was found at step 306. So, control proceeds to step 316, where a variable OFFSET is set equal to NEXT_INST minus the absolute address offset into the NLM pointed to by NLM_LIST. OFFSET thus equals the offset into the NLM in which the problem occurred.

Proceeding to step 318, a variable FILE_NAME is set equal to the file name pointed to by NLM_LIST. The file name length is contained in the first memory location, followed by the actual characters.

Proceeding to step 320, a message is logged stating "Code executing in module [FILE_NAME] at offset [OFFSET] when dead man timeout occurred." On the next system restart, it is known what NLM caused the problem, as well as where in that NLM's code the problem occurred.

It will be appreciated that by providing this information, subsequent debugging and system diagnosis is greatly facilitated. Instead of not knowing what caused the catastrophic system failure, a technician then knows either where in the system the failure occurred or where in one of the NLMs the problem occurred.

It will further be appreciated that a system could be implemented incorporating the spirit of the invention with many changes from the disclosed embodiment. For example, a great variety of hardware could be used to generate an appropriate interrupt a predetermined time before the ASR timer 116 times out.

Further, although the disclosed embodiment uses a non-maskable interrupt, various other types of interrupts could be used, such as a system management interrupt present on many Intel based microprocessors. Also, although the logging of the error was shown to the NVRAM 114, a message could be logged, for example, over a serial link to a monitoring processor, or to a variety of other locations. By providing an anticipatory interrupt before a system reset, helpful diagnostic information can be stored before that reset actually occurs.

Further, it will be appreciated that the amount of time before a reset that the NMI can be set to occur can be easily adjusted by changing the value in the threshold register 119. Of course, this value should not be so small that a reset will occur during the processing of a non-maskable interrupt, but a variety of other values could be chosen.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method for logging errors before a hardware reset in a microcomputer system including a microprocessor with a hardware reset input and an interrupt input, the method comprising the steps of:

determining that a hardware reset will be provided to the hardware reset input;

providing an interrupt to the interrupt input a predetermined period of time before the hardware reset will be provided to the hardware reset input in response to determining that a hardware reset will be provided to the hardware reset input; and executing an interrupt routine in response to said interrupt to log an error indicating operation of the interrupt routine.

2. The method of claim 1, wherein the microcomputer system further includes a reloadable timer with an indicator of time remaining until timeout, and wherein said step of determining that a hardware reset will be provided to the hardware reset input further comprises the steps of:

periodically reloading the reloadable timer during normal operation of the microcomputer system; and if the indicator of time remaining until timeout falls below a predetermined threshold, indicating that it is determined that a hardware reset will be provided to the hardware reset input within the predetermined period of time.

3. The method of claim 1, wherein the microcomputer system further includes a reloadable timer and a delay timer with an output coupled to the microcomputer hardware reset input, and wherein said step of determining that a hardware reset will be provided to the hardware reset input further comprises the steps of:

periodically reloading the reloadable timer during normal operation of the microcomputer system; and if the reloadable timer times out, indicating that it is determined that a hardware reset will be provided to the hardware reset input within the predetermined period of time and starting the delay timer.

4. The method of claim 1, wherein said step of executing an interrupt routine further comprises the steps of:

determining the address where the microprocessor was executing when said interrupt was provided to the microprocessor; and logging a message indicative of where it was determined that the microprocessor was executing.

5. The method of claim 4, wherein the microcomputer system is running an operating system that maintains a list of loaded modules and wherein said step of determining the address further comprises the step of:

determining if and which of currently loaded modules was executing; and wherein said step of logging further comprises the step of:
    logging the determined loaded module's name and execution address.

6. The method of claim 5, wherein the operating system is Netware and wherein said step of determining the address further comprises the step of:

determining if and which of currently loaded Netware Loadable Modules was executing; and wherein said step of logging further comprises the step of:
    logging the Netware Loadable Module name and execution address.

7. The method of claim 4, wherein said step of logging further comprises the step of:

writing said message to a non-volatile random access memory.

8. The method of claim 1, wherein said step of providing an interrupt further comprises the step of:

providing a non-maskable interrupt to the microprocessor.

9. A computer system that logs errors before a hardware reset, comprising:

a bus with data, address, and control lines;

a microprocessor with a reset input and an interrupt input, said microprocessor coupled to said bus;

a mass storage subsystem coupled to said bus for providing data to and storing data from said microprocessor over said bus;

a software module for periodic execution by said microprocessor, said software module, when periodically executed, periodically performs a predetermined operation;

a timer circuit providing a reset signal to the reset input in response to said software module failing to periodically perform the predetermined operation;

an interrupt circuit for providing an interrupt signal to the interrupt input a predetermined period of time before said timer circuit provides the reset signal; and an error logging software module for execution by said microprocessor in response to the interrupt signal, said error logging software module, when executed, logging an error message.

10. The computer system of claim 9, wherein said error logging software module further comprises:

address determining code that, when executed, determines an address at which said microprocessor was executing when the interrupt signal was provided; and logging code that, when executed, logs a message indicating the address.

11. The computer system of claim 10, wherein the computer includes a semi-permanent memory, wherein said error logging software module further comprises:

code for writing the error message to the semi-permanent memory.

12. The computer system of claim 9, wherein the computer includes a semi-permanent memory, wherein said error logging software module further comprises:

code for writing the error message to the semi-permanent memory.

13. The computer system of claim 9, wherein the computer system runs the Netware Operating System, and wherein said error logging software module is a Netware Loadable Module.

14. The computer system of claim 9, wherein the computer system runs an operating system that includes a list of loaded modules, and wherein said error logging software module further comprises:

module determining code for determining if and which of currently loaded modules was executing when the interrupt was provided; and code for writing an error message containing the name of the determined executing loaded module.

15. The computer system of claim 9, wherein the computer system runs the Netware Operating System, and wherein said error logging software module further comprises:

Netware module determining code for determining if and which of currently loaded Netware Loadable Modules was executing when said interrupt signal was provided; and code for writing an error message containing the name of the determined executing loaded module.

16. The computer system of claim 9 further comprising:

a network interface card coupled to said bus for communication with a network; and a memory subsystem coupled to said bus for providing memory storage for said microprocessor.

17. The computer system of claim 9, wherein said timer circuit includes:

a reloadable timer with an indicator of time remaining until timeout, wherein said interrupt circuit is responsive to the indicator indicating the predetermined period of time.

18. The computer system of claim 17, wherein the predetermined operation reloads the reloadable timer.

19. The computer system of claim 9, wherein said timer circuit includes:

a reloadable timer; and a delay timer responsive to a timeout of the reloadable timer and for providing the reset signal to the reset input the predetermined period of time after the timeout of the reloadable timer, wherein said interrupt circuit is responsive to the timeout of the reloadable timer.

20. The computer system of 19, wherein the predetermined operation reloads the reloadable timer.

21. The computer system of claim 9, wherein the interrupt signal is a non-maskable interrupt signal.

* * * * *